US012101242B2

(12) United States Patent
Pande et al.

(10) Patent No.: US 12,101,242 B2
(45) Date of Patent: Sep. 24, 2024

(54) WORKLOAD IDENTIFICATION FOR NETWORK FLOWS OVER STRETCHED LAYER 2 NETWORKS

(71) Applicant: VMware LLC, Palo Alto, CA (US)

(72) Inventors: Ambarish Prashant Pande, Pune (IN); Devraj Narendra Baheti, Pune (IN); Avinash Nigam, Pune (IN); Vishal Ranjan, Pune (IN); Prahalad Deshpande, Pune (IN)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 17/396,861

(22) Filed: Aug. 9, 2021

(65) Prior Publication Data

US 2022/0393964 A1 Dec. 8, 2022

(30) Foreign Application Priority Data

Jun. 4, 2021 (IN) .............................. 202141024992

(51) Int. Cl.
*H04L 45/021* (2022.01)
*H04L 45/00* (2022.01)
*H04L 61/255* (2022.01)
*H04L 67/1031* (2022.01)

(52) U.S. Cl.
CPC ............ *H04L 45/021* (2013.01); *H04L 45/38* (2013.01); *H04L 45/72* (2013.01); *H04L 61/255* (2013.01); *H04L 67/1031* (2013.01)

(58) Field of Classification Search
None
See application file for complete search history.

(56) References Cited

U.S. PATENT DOCUMENTS

| 2017/0034057 A1* | 2/2017 | Kapadia | ................ H04L 45/745 |
| 2019/0034298 A1* | 1/2019 | Maskalik | ............ H04L 41/0663 |
| 2019/0260654 A1* | 8/2019 | Toshniwal | .............. H04L 43/08 |
| 2019/0312813 A1* | 10/2019 | Ellis | ........................ H04L 43/08 |

* cited by examiner

*Primary Examiner* — Derrick W Ferris
*Assistant Examiner* — Keith Follansbee
(74) *Attorney, Agent, or Firm* — King Intellectual Asset Management

(57) ABSTRACT

Embodiments described herein generally involve identifying workloads in a multi-site networking environment. Embodiments include determining that a given network is stretched across a first network segment at a first site and a second network segment at a second site. Embodiments include creating a stretched administrative domain for the given network and mapping an address of the given network to the stretched administrative domain in a lookup table for an administrative domain associated with the first network segment. Embodiments include receiving a flow record from an observation point in the first network segment, the flow record having a source IP address associated with the second network segment and a destination IP address associated with the first network segment. Embodiments include identifying a source workload and destination workload of the flow record using the lookup table and a workload identification table that maps combinations of IP addresses and administrative domains to workloads.

17 Claims, 7 Drawing Sheets

| CASE | SOURCE SEGMENT | DEST SEGMENT | SOURCE AD FROM SOURCE PERSPECTIVE | DEST AD FROM SOURCE PERSPECTIVE | SOURCE AD FROM DEST PERSPECTIVE | DEST AD FROM DEST PERSPECTIVE |
|---|---|---|---|---|---|---|
| 1 | 216 | 218 | S210-R214-AD | S210-R214-AD | S210-R214-AD | S210-R214-AD |
| 2 | 218 | 226 | S210-R214-AD | S210-R214-AD | S220-R224-AD | S220-R224-AD |
| 3 | 226 | 218 | S220-R224-AD | S220-R224-AD | S210-R214-AD | S210-R214-AD |
| 4 | 228 | 226 | S220-R224-AD | S220-R224-AD | S220-R224-AD | S220-R224-AD |
| 5 | 218 | 218 | S210-R214-AD | S210-R214-AD | S210-R214-AD | S210-R214-AD |
| 6 | 226 | 226 | S220-R224-AD | S220-R224-AD | S220-R224-AD | S220-R224-AD |
| 7 | 216 | 8.8.8.8 | S210-R214-AD | GLOBAL | S210-R214-AD | GLOBAL |
| 8 | 218 | 8.8.8.8 | S210-R214-AD | GLOBAL | INVALID | GLOBAL |
| 9 | 226 | 8.8.8.8 | S220-R224-AD | GLOBAL | INVALID | GLOBAL |
| 10 | 228 | 8.8.8.8 | S220-R224-AD | GLOBAL | S220-R224-AD | GLOBAL |

Fig. 3

| CASE | SOURCE SEGMENT | DEST SEGMENT | SOURCE AD FROM SOURCE PERSPECTIVE | DEST AD FROM SOURCE PERSPECTIVE | SOURCE AD FROM DEST PERSPECTIVE | DEST AD FROM DEST PERSPECTIVE |
|---|---|---|---|---|---|---|
| 1 | 216 | 218 | S210-R214-AD | STRETCHED-AD | S210-R214-AD | STRETCHED-AD |
| 2 | *218* | *226* | *STRETCHED-AD* | *STRETCHED-AD* | *STRETCHED-AD* | *STRETCHED-AD* |
| 3 | *226* | *218* | *STRETCHED-AD* | *STRETCHED-AD* | *STRETCHED-AD* | *STRETCHED-AD* |
| 4 | 228 | 226 | S220-R224-AD | STRETCHED-AD | S220-R224-AD | STRETCHED-AD |
| 5 | 218 | 218 | STRETCHED-AD | STRETCHED-AD | STRETCHED-AD | STRETCHED-AD |
| 6 | 226 | 226 | STRETCHED-AD | STRETCHED-AD | STRETCHED-AD | STRETCHED-AD |
| 7 | 216 | 8.8.8.8 | S210-R214-AD | GLOBAL | S210-R214-AD | GLOBAL |
| 8 | *218* | *8.8.8.8* | *STRETCHED-AD* | *GLOBAL* | *STRETCHED-AD* | *GLOBAL* |
| 9 | *226* | *8.8.8.8* | *STRETCHED-AD* | *GLOBAL* | *STRETCHED-AD* | *GLOBAL* |
| 10 | 228 | 8.8.8.8 | S220-R224-AD | GLOBAL | S220-R224-AD | GLOBAL |

Fig. 5

WORKLOAD IDENTIFICATION FOR NETWORK FLOWS OVER STRETCHED LAYER 2 NETWORKS

RELATED APPLICATION

Benefit is claimed under 35 U.S.C. 119(a)-(d) to Foreign Application Serial No. 202141024992 filed in India entitled "WORKLOAD IDENTIFICATION FOR NETWORK FLOWS OVER STRETCHED LAYER 2 NETWORKS", on Jun. 4, 2021, by VMware, Inc., which is herein incorporated in its entirety by reference for all purposes.

BACKGROUND

Records of traffic flow are often captured in networking environments and used for the purposes of troubleshooting and analysis. For example, these records may be used to determine security policies, identify dependencies, migrate workloads (e.g., computing tasks that exists with a discrete, isolated and detached set of application logic (with specific policies, rules and behavioral characteristics) that can be executed independently (and autonomously if needed) of a specific parent (or related) application), allocate resources, and the like. In some cases, flow records may include information about network traffic, such as source and destination IP addresses and ports, protocol information, and the like. Flow records may be captured at various observation points (e.g., switches, routers, firewalls, and the like) within a networking environment and aggregated by one or more management entities for analysis.

As networks become more complex and heterogeneous, certain difficulties may arise in the process of analyzing flow records. For example, multi-site networking environments may involve flows between different network sites, such as different data centers. In some cases, a single network such as a Layer 2 (L2) network may be stretched across two sites, and the same range of IP addresses spans both sites. While some techniques for disambiguating source and destination workloads of flows involve the use of administrative domains within which every IP address is unique, difficulties arise when a network is stretched from a first network segment associated with a first administrative domain on a first site to a second network segment associated with a second administrative domain on a second site. For example, it can be challenging to determine to which administrative domain a source IP address and/or a destination IP address of a flow record corresponds, particularly in cases where networks have been stretched across the multiple sites. Accordingly, there is a need in the art for improved methods of network flow enrichment, particularly in multi-site networking environments.

BRIEF DESCRIPTION OF THE DRAWINGS

FIG. 3 illustrates another example related to workload identification in flow records according to embodiments of the present disclosure.

FIG. 5 illustrates another example related to workload identification in flow records according to embodiments of the present disclosure.

DETAILED DESCRIPTION

Embodiments presented herein relate to systems and methods for workload identification in network flows. In this specification, the terms "logical network entity," "logical network element," and the like will refer to software defined networking (SDN) logical overlay network features, such as logical switches, logical routers, etc. The terms, "virtual entities" and the like will refer to software-implemented networking services that reside in a distributed manner on a plurality of physical host computers and may handle logical overlay or physical underlay network traffic. In so doing, virtual entities, which include software-implemented switches, routers, tunnel endpoints, network filters/firewalls, etc., implement policies for the overlay software-defined network, such as by implementing the logical network entities.

Figure 1:
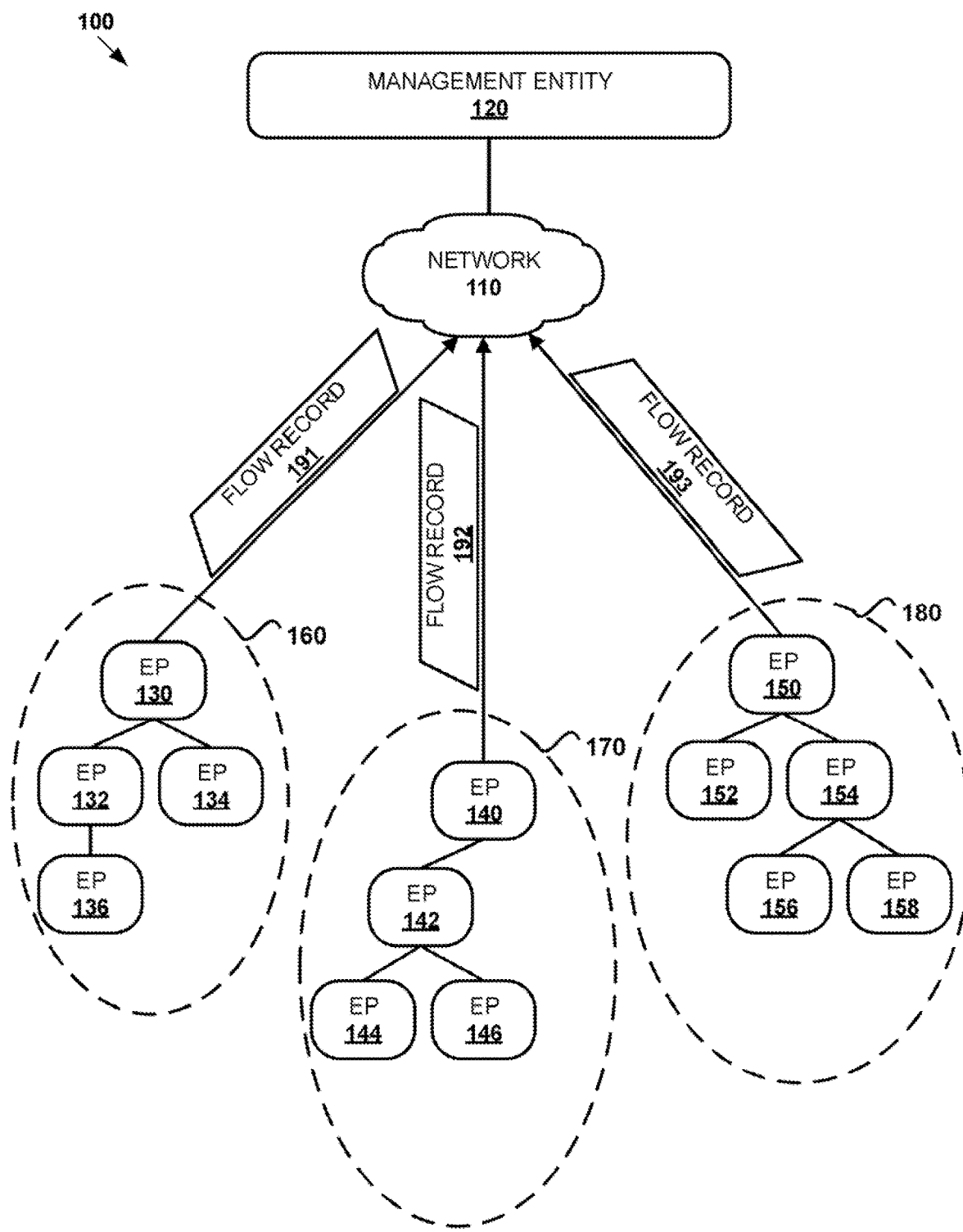
FIG. 1 is a diagram of a network environment in which embodiments of the present disclosure may be implemented.

FIG. 1 is a diagram of a network environment 100 in which embodiments of the present disclosure may be implemented. As shown, network environment 100 includes a management entity 120 and a plurality of endpoints (EPs) 130-158 connected via a network 110. Management entity 120 may be a physical or virtual computing device that performs operations related to identifying workloads (e.g., EPs) in network flows as described herein, such as operations 600 of FIG. 6, described below. Each EP (e.g., 130, 132, and the like) may comprise a physical or virtual computing device, such as a router, switch, gateway, firewall, virtual machine, desktop computer, laptop computer, mobile phone, virtual storage entity, database, server, or the like. EPs 130, 132, 134, and 136 are a part of a separate portion 160 of network environment 100, which may comprise a distinct network that employs a distinct set of isolation, bridging, routing and network translation mechanisms for any given flow than other portions (e.g., 170 and 180) of networking environment 100. Portion 170 comprises EPs 140, 142, 144, and 146, and portion 180 comprises EPs 150, 152, 154, 156, and 158.

Flow records 191, 192, and 193 may comprise records of network traffic that are captured by one or more EPs (e.g., 130, 140, and 150) and sent to management entity 120. For example, flow records 191, 192, and 193 may comprise netflow records. Netflow is a set of techniques for collecting and analyzing network "flows" (or recorded network traffic) in order to analyze network status. In certain embodiments, flow records 191, 192, and 193 comprise "5-tuples" which include a source IP address, destination IP address, source port, destination port, and protocol. Flow records 191, 192, and 193 may, in some instances include flow statistics (e.g., packets dropped, timeouts, failures, and the like). Flow records 191, 192, and 193 may further comprise observation point information about the observation point (e.g., endpoint) at which the record was captured, such as an IP address or other identifier of a router, switch, gateway, firewall, or other entity that captured the flow record.

Management entity 120 may collect and analyze flow records in order to determine security policies, identify dependencies, migrate workloads, allocate resources, and the like. For example, management entity 120 may be associated with a service provider (e.g., a provider of database services, streaming services, web services, or the like) that serves a plurality of endpoints in a hybrid network environment. Key components in the process of analyzing flow records are segregation and deduplication of flow records, as well as identifying workloads associated with flow records. However, because network environment 100 is a hybrid networking environment which may include non-unique IP addresses (e.g., each portion 160, 170, and 180 may include its own set of IP addresses that may overlap with IP addresses of other portions), it may be difficult to identify a source and destination workload of a flow record based on a source and destination IP address. These obstacles to accurately determining the workload information for source and destination IP addresses constitute a significant challenge and prevent visibility into traffic patterns and application dependencies based on unsegregated flow records having overlapping IP addresses.

Using observation point mapping information, lookup tables, and workload identification tables for workload identification in flow records is described in more detail in U.S. Pat. No. 10,873,513, the contents of which are incorporated herein by reference in their entirety.

For example, every flow record contains observation point information that specifies or describes the precise point in the networking topology where the flow was observed. Thus, network data such as topology and routing data may be aggregated (e.g., by management entity 120) from a plurality of endpoints (e.g., routers, switches, gateways, firewalls, and the like) throughout the network environment, and used to create a detailed network topology. Management entity 120 may then utilize the network topology for determination of administrative domains (e.g., network views) within which every IP address is unique.

After determining a plurality of administrative domains, management entity 120 may generate, based on the network topology, observation point mapping information that maps observation points to administrative domains. For example, within each administrative domain, management entity 120 may identify each workload within the administrative domain and add an entry to the observation point mapping information that maps the administrative domain to each observation point that observes the workload. Management entity 120 may then generate a plurality of lookup tables based on the network topology, each lookup table being associated with a particular administrative domain, and each lookup table mapping IP subnets (e.g., groups of IP addresses) to administrative domains. For example, if IP addresses within a first administrative domain can communicate with particular IP subnets within a second administrative domain, the lookup table for the first administrative domain will map the particular IP subnets to the second administrative domain (e.g., if these IP subnets are encountered within a flow record observed within the first administrative domain, then the table will indicate that they belong to workloads within the second administrative domain). Management entity 120 may also generate a workload identification table that maps workloads to combinations of IP addresses and administrative domains. For example, each <IP address, administrative domain> pair may be mapped to a workload.

In a runtime process, management entity 120 may receive flow records (e.g., flow records 191, 192, and 193) and use techniques described herein to identify a source and destination workload of each flow record. For example, management entity 120 may use the observation point mapping information to determine the administrative domain of the observation point of a flow record (e.g., based on observation point information in the flow record). Management entity 120 may then select a lookup table based on the administrative domain of the observation point (e.g., the lookup table that is associated with the administrative domain), and use the lookup table to determine source and destination administrative domains (e.g., based on source and destination IP addresses included in the flow record). In some embodiments, management entity 120 may generate a 7-tuple that includes the information from the 5-tuple included in the flow record (e.g., source IP address, destination IP address, source port, destination port, and protocol) as well as the source and destination administrative domains. This 7-tuple fully disambiguates the flow record within the network environment, as it allows workloads to be uniquely identified regardless of which portion 160, 170, or 180 the flow record was received from.

Management entity 120 may use the workload identification table to identify a source workload and a destination workload of the flow record. For example, management entity 120 may use a combination of the source IP address and the source administrative domain to identify the source workload in the workload identification table. Similarly, management entity 120 may use a combination of the destination IP address and the destination administrative domain to identify the destination workload in the workload identification table. Having uniquely identified the source and destination workloads associated with each flow record, management entity 120 may proceed with analysis operation based on the flow records. For example, management entity 120 may use the flow records to determine security policies, identify dependencies, migrate workloads, allocate resources, and the like.

As described in more detail below with respect to FIG. 1, a network such as an L2 network may be stretched across multiple sites. For example, one portion 180 of networking environment 100 may represent an L2 network that is stretched from a first site to a second site. In such cases, it can be difficult to identify a source workload and destination workload of a flow record based on the source IP address and destination IP address of the flow record because, depending on which site the observation point is located in, it may incorrectly believe that all IP addresses in the stretched network are in the same site. This problem is illustrated and described in more detail below with respect to FIGS. 2 and 3.

In order to address this problem, techniques described herein involve creating a separate administrative domain for a stretched network and mapping the IP addresses of the stretched network to the separate "stretched" administrative domain. For example, a determination that a network is stretched may be made based on the network topology, and a stretched administrative domain may be created based on this determination. This process is described in more detail below with respect to FIGS. 4-6. Thus, source and destination IP addresses of flow records can be accurately disambiguated regardless of which site of the stretched network an observation point is located in, as all IP addresses in the stretched network will be mapped to the stretched administrative domain.

While certain techniques are described herein (e.g., with respect to FIGS. 1-6) as involving the use of tables, it is understood that other types of data structures may be employed. Tables are merely included in this disclosure as one example, and any manner of storing associations among data may be used. For example, the observation point mapping information, the lookup tables, and the workload identification table may be implemented using a variety of types of data structures other than tables without departing from the scope of the present disclosure, such as hashes, vectors, stateless databases, databases, tree structures, etc.

Figure 2:
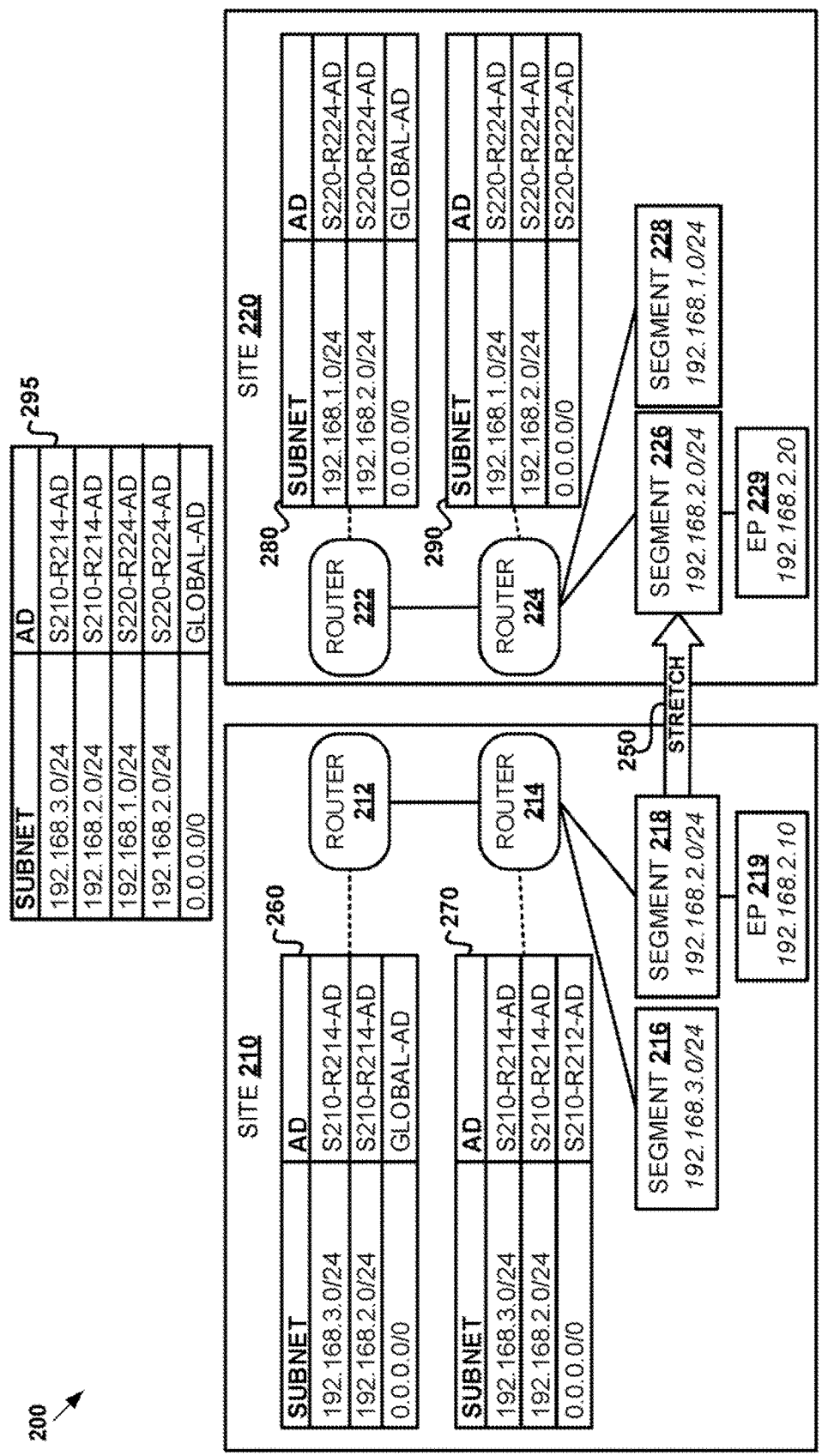
FIG. 2 illustrates an example related to workload identification in flow records according to embodiments of the present disclosure.

FIG. 2 is an illustration 200 of an example related to workload identification in flow records according to embodiments of the present disclosure.

Illustration 200 includes sites 210 and 220, which represent separate networking environments such as private on-premise data centers, public data centers, private clouds, public clouds, and/or the like. In one embodiment, sites 210 and 220 represent data centers 730 and 750 of FIG. 7, as described in more detail below with respect to FIG. 7.

Many networking users such as businesses utilize multi-site networking environments, and may migrate workloads from one site to another in order to meet growing resource requirements, modernize infrastructure, lower costs, and/or improve security and reliability. Apart from migration, users also utilize such high speed and high bandwidth cross-site connectivity for generating backups of their workloads, databases, and other entities. In such cases, networks may be stretched across sites.

Site 210 includes routers 212 and 215, and site 220 includes routers 222 and 224. Routers 212, 214, 222, and 224 each represent a physical or virtual router, and is associated with its own administrative domain. For example, router 212 is associated with an administrative domain named S210-R212-AD, "as the administrative domain corresponds to site 210 and router 212. Similarly, routers 214, 222, and 224 are associated, respectively, with administrative domains S210-R214-AD, S220-R222-AD, and S220-R224-AD.

Router 214 comprises two segments 216 and 218. Segments 216 and 218 represent independent segments of the network created by router 214, each being associated with a particular range of IP addresses. Segment 216 is associated with the IP address range 192.168.3.0/24 and segment 218 is associated with the IP address range 192.168.2.0/24. An endpoint 219 is located within segment 218, and has an IP address of 192.168.2.10. Endpoint 219 may be, for example, a virtual machine. In one example, endpoint 219 is a VCI 735 of FIG. 7, as described in more detail below with respect to FIG. 7.

Similarly, router 224 comprises two segments 226 and 228. Segments 226 and 228 represent independent segments of the network created by router 224, each being associated with a particular range of IP addresses. Segments 216, 218, 226, and 228 may, in some embodiments, represent L2 networks.

At 250, the L2 network associated with segment 218 is stretched to segment 226, thus creating a single L2 network that includes both segment 218 and segment 226. Thus, both segments 218 and 226 are associated with the IP address range of 192.168.2.0/24. Segment 228 is associated with the IP address range 192.168.1.0/24. An endpoint 229 is located within segment 226, and has an IP address of 192.168.2.20. Endpoint 229 may be, for example, a virtual machine. In one example, endpoint 229 is a VCI 735 of FIG. 7, as described in more detail below with respect to FIG. 7.

A lookup table is associated with each of routers 212, 214, 222, and 224, because each of these routers corresponds to its own administrative domain. Thus, for any observation point within one of routers 212, 214, 222, and 224, the lookup table for the corresponding router will be used to determine administrative domains of source and destination IP addresses of flow records received from the observation point. Lookup tables 260, 270, 280, 290, and 295 may be generated and/or stored by management component 120 of FIG. 1.

Lookup table 260 is associated with router 212 (e.g., the administrative domain S210-R212-AD), lookup table 270 is associated with router 214 (e.g., the administrative domain S210-R214-AD), lookup table 280 is associated with router 222 (e.g., the administrative domain S220-R222-AD), and lookup table 290 is associated with router 224 (e.g., the administrative domain S220-R224-AD). Lookup table 295 is associated with a global administrative domain (e.g., global-AD), which may contain all IP addresses not mapped to other administrative domains. Each of lookup tables 260, 270, 280, 290, and 295 includes mappings of subnets (e.g., IP address ranges) to administrative domains.

In lookup table 260, subnet 192.168.3.0/24 is mapped to S210-R214-AD, subnet 192.168.2.0/24 is mapped to S210-R214-AD, and subnet 0.0.0.0/0 is mapped to GLOBAL-AD (e.g., because GLOBAL-AD is the parent administrative domain of S210-R212-AD).

In lookup table 270, subnet 192.168.3.0/24 is mapped to S210-R214-AD, subnet 192.168.2.0/24 is mapped to S210-R214-AD, and subnet 0.0.0.0/0 is mapped to S210-R212-AD (e.g., because S210-R212-AD is the parent administrative domain of S210-R214-AD).

In lookup table 280, subnet 192.168.1.0/24 is mapped to S220-R224-AD, subnet 192.168.2.0/24 is mapped to S220-R224-AD, and subnet 0.0.0.0/0 is mapped to GLOBAL-AD (e.g., because GLOBAL-AD is the parent administrative domain of S220-R222-AD).

In lookup table 290, subnet 192.168.1.0/24 is mapped to S220-R224-AD, subnet 192.168.2.0/24 is mapped to S220-R224-AD, and subnet 0.0.0.0/0 is mapped to S220-R222-AD (e.g., because S220-R222-AD is the parent administrative domain of S220-R224-AD).

In lookup table 295, subnet 192.168.3.0/24 is mapped to S210-R214-AD, subnet 192.168.2.0/24 is mapped to S210-R214-AD, subnet 192.168.1.0/24 is mapped to S220-R224-AD, subnet 192.168.2.0/24 is also mapped to S220-R224-AD, and subnet 0.0.0.0/0 is mapped to GLOBAL-AD (e.g., because GLOBAL-AD does not have a parent administrative domain, and so maps to itself as its own parent).

Due to the stretched network from segment 218 to segment 226, the same IP address range (192.168.2.0/24) is mapped to two different administrative domains in various lookup tables. For example, 192.168.2.0/24 is mapped to S210-R214-AD in lookup tables 260 and 270, but is alternatively mapped to S220-R224-AD in lookup tables 280 and 290. Furthermore, 192.168.2.0/24 is mapped to both S210-R214-AD and S220-R224 in lookup table 295 for the global administrative domain. Thus, depending on the observation point from which a flow record is received, management entity 120 may not be able to accurately disambiguate a source or destination IP address in the flow record that is the 192.168.2.0/24 range. This problem is illustrated and described in more detail below with respect to FIG. 3.

FIG. 3 depicts a table 300 representing an example related to workload identification in flow records according to embodiments of the present disclosure.

Table 300 includes ten cases representing flows that may correspond to flow records received by management entity 120 of FIG. 1 from the multi-site networking environment depicted in illustration 200 of FIG. 2. FIG. 3 is described relative to the components described above with respect to FIG. 2. For each case 1-10, table 300 lists the source segment from which the flow originated and the destination segment to which the flow was destined, as well as the source administrative domain and destination administrative domain from the perspectives of both the source segment and the destination segment. Cases 2, 3, 8, and 9 represent problem cases which are solved by techniques described herein.

In an example of a non-problematic case, for case 1, the source segment of a flow is segment 216 and the destination segment is segment 218. From the perspective of the source segment (segment 216), the source administrative domain is S210-R214-AD and the destination administrative domain is S210-R214-AD. From the perspective of the destination segment (segment 218), the source administrative domain is S210-R214-AD and the destination administrative domain is S210-R214-AD. Thus, in case 1, the flow record can be accurately disambiguated regardless of whether the observation point is located in segment 216 or segment 218 because, in either case, the source and destination IP addresses will be mapped to the correct administrative domain, and the administrative domain and IP address combinations can be used to identify the workloads using a workload identification table. Cases 4-7 and 10 similarly represent cases in which the flow record can be accurately disambiguated.

However, problems arise in cases 2, 3, 8, and 9. For case 2, the source segment of a flow is segment 218 and the destination segment is segment 226. For example, the flow may be sent from EP 219 to EP 229 across the stretched network between sites 210 and 220. From the perspective of the source segment (segment 218), the source administrative domain is S210-R214-AD and the destination administrative domain is (incorrectly) S210-R214-AD. From the perspective of the destination segment (segment 226), the source administrative domain is (incorrectly) S220-R224-AD and the destination administrative domain is S220-R224-AD. Thus, in case 2, the flow record cannot be accurately disambiguated when received from an observation point located in either segment 218 or segment 226. For example, if a flow record corresponding to case 2 is received from an observation point in segment 218, the destination IP address (e.g., 192.168.2.20) will incorrectly be mapped to S210-R214-AD corresponding to site 210 when the destination workload (e.g., EP 229) is actually located in S220-R224-AD corresponding to site 220. Thus, there will be no entry in a workload identification table for the combination of the IP address 192.168.2.20 and S210-R214-AD, and the identifying the destination workload will not be possible.

Similarly, for case 3, the source segment of a flow is segment 226 and the destination segment is segment 218. For example, the flow may be sent from EP 229 to EP 219 across the stretched network between sites 220 and 210. From the perspective of the source segment (segment 226), the source administrative domain is S220-R224-AD and the destination administrative domain is (incorrectly) S220-R224-AD. From the perspective of the destination segment (segment 218), the source administrative domain is (incorrectly) S210-R214-AD and the destination administrative domain is S210-R214-AD. Thus, in case 3, the flow record cannot be accurately disambiguated when received from an observation point located in either segment 226 or segment 218, similarly to case 2 above.

Problems also arise with respect to the global administrative domain in certain cases. For case 8, the source segment of a flow is segment 218 and the destination segment corresponds to the IP address 8.8.8.8 (e.g., in the global administrative domain). From the perspective of the source segment (segment 218), the source administrative domain is 210-R214-AD and the destination administrative domain is GLOBAL-AD. From the perspective of the destination segment (the global administrative domain), the source administrative domain is invalid and the destination administrative domain is GLOBAL-AD. The reason that the source administrative domain is invalid from the perspective of the global administrative domain is because the IP address range 192.168.2.0/24 is mapped to both S210-R214-AD and S220-R224-AD in the lookup table 295 for the global administrative domain, and so it will not be possible to determine which administrative domain corresponds to the source IP address of the flow. Thus, in case 8, the flow record cannot be accurately disambiguated when received from an observation point located in the global administrative domain.

Similarly, for case 9, the source segment of a flow is segment 226 and the destination segment corresponds to the IP address 8.8.8.8 (e.g., in the global administrative domain). From the perspective of the source segment (segment 226), the source administrative domain is S220-R224-AD and the destination administrative domain is GLOBAL-AD. From the perspective of the destination segment (the global administrative domain), the source administrative domain is invalid and the destination administrative domain is GLOBAL-AD. The reason that the source administrative domain is invalid from the perspective of the global administrative domain is because the IP address range 192.168.2.0/24 is mapped to both S210-R214-AD and S220-R224-AD in the lookup table 295 for the global administrative domain, and so it will not be possible to determine which administrative domain corresponds to the source IP address of the flow. Thus, in case 9, similarly to case 8 above, the flow record cannot be accurately disambiguated when received from an observation point located in the global administrative domain.

The problems identified with respect to cases 2, 3, 8, and 9 above are addressed through techniques described herein for creating a stretched administrative domain for a network that is stretched across multiple sites, as described in more detail below with respect to FIGS. 4 and 5.

Figure 4:
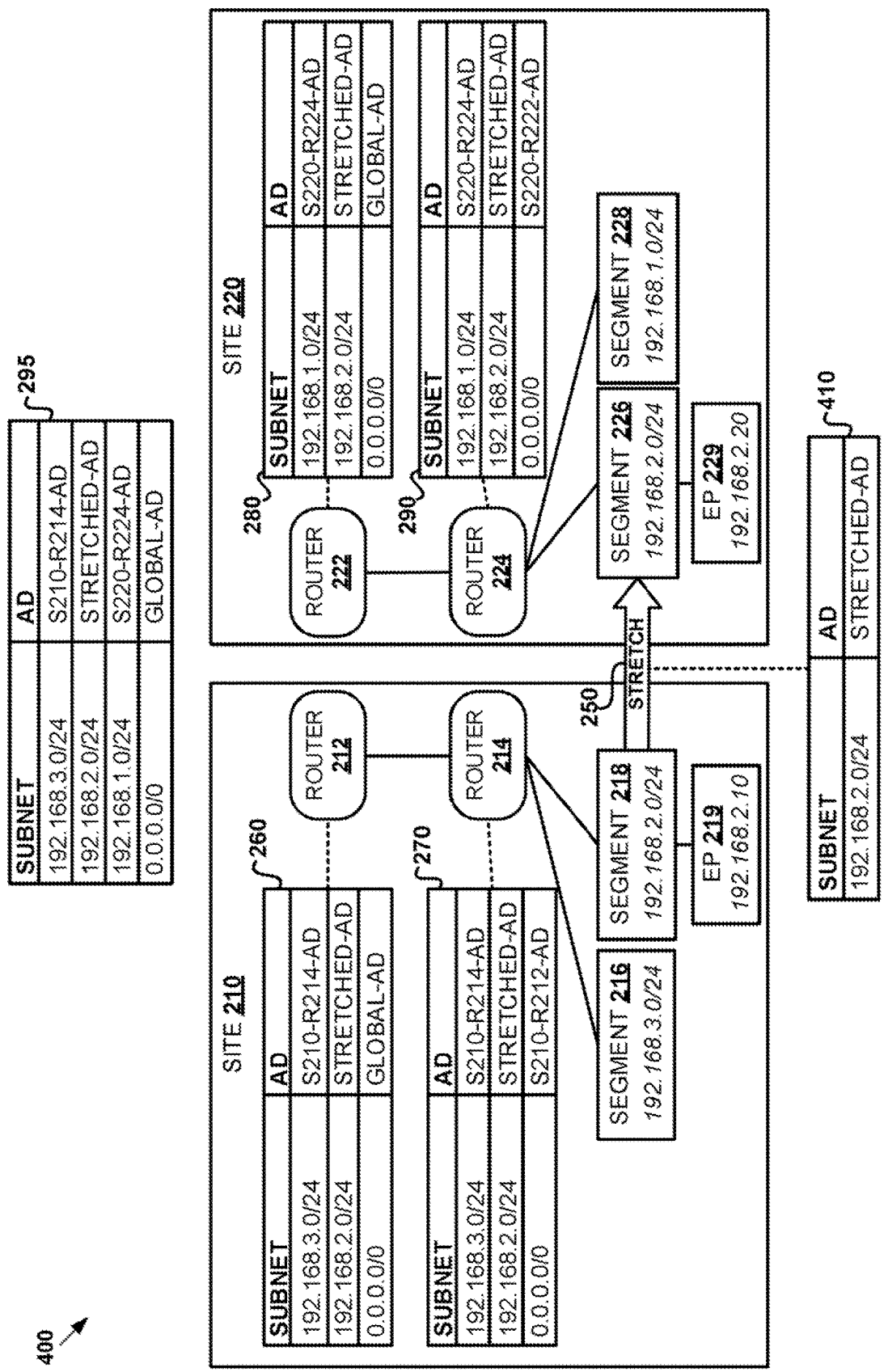
FIG. 4 illustrates another example related to workload identification in flow records according to embodiments of the present disclosure.

FIG. 4 is an illustration 400 of another example related to workload identification in flow records according to embodiments of the present disclosure. In particular, illustration 400 depicts solutions to issues identified above with respect to FIGS. 2 and 3.

Illustration 400 includes sites 210 and 220, routers 212, 214, 222, and 224, segments 216, 218, 226, and 228, endpoints 219 and 229, stretched network 250, and lookup tables 260, 270, 280, 290, and 295 of FIG. 2.

In order to address the issues identified above, a new administrative domain "STRETCHED-AD" is created for the stretched network 250 across segments 218 and 226. For example, management entity 120 of FIG. 1 may determine that the network is stretched based on the network topology (e.g., based on topology and state information received from throughout the networking environment as described above), and may create STRETCHED-AD based on this determination. A lookup table 410 is created for STRETCHED-AD, mapping subnet 192.168.2.0/24 to STRETCHED-AD. Furthermore, lookup tables 260, 270, 280, 290, and 295 are updated to map subnet 192.168.2.0/24 only to STRETCHED-AD. Thus, regardless of which lookup table is used, any IP address in the 192.168.2.0/24 range will be mapped to STRETCHED-AD.

The workload identification table may also be updated such that every workload in the stretched network is mapped to a combination of its IP address and the administrative domain STRETCHED-AD. In one example, the workload identification table is updated to map an identifier of EP 219 to a combination of the IP address 192.168.2.10 and the administrative domain STRETCHED-AD and to map an identifier of EP 229 to a combination of the IP address 192.168.2.20 and the administrative domain STRETCHED-AD.

Thus, as described in more detail below with respect to FIG. 5, source workloads and destination workloads of flow records can be accurately disambiguated from throughout the networking environment depicted in illustration 400.

FIG. 5 depicts a table 500 representing another example related to workload identification in flow records according to embodiments of the present disclosure.

Table 500 includes cases 1-10 from FIG. 3. FIG. 5 is described relative to the components described above with respect to FIG. 4. For each case 1-10, table 500 lists the source segment from which the flow originated and the destination segment to which the flow was destined, as well as the source administrative domain and destination administrative domain from the perspectives of both the source segment and the destination segment. Unlike in table 300 of FIG. 3, cases 2, 3, 8, and 9 in table 500 can be accurately disambiguated based on the changes described above with respect to FIG. 4.

For case 1, from the perspective of the source segment (segment 216), the source administrative domain is S210-R214-AD and the destination administrative domain is STRETCHED-AD. Similarly, from the perspective of the destination segment (segment 218), the source administrative domain is S210-R214-AD and the destination administrative domain is STRETCHED-AD. Thus, flow records corresponding to case 1 can be accurately disambiguated regardless of where the observation point is located because the mappings are consistent and accurate.

For case 2, from the perspective of the source segment (segment 218), the source administrative domain is STRETCHED-AD and the destination administrative domain is STRETCHED-AD. Similarly, from the perspective of the destination segment (segment 226), the source administrative domain is STRETCHED-AD and the destination administrative domain is STRETCHED-AD. Thus, in case 2 of table 500, the flow record can now be accurately disambiguated regardless of where the observation point is located because the source and destination IP addresses will be uniformly mapped to STRETCHED-AD.

For case 3, from the perspective of the source segment (segment 226), the source administrative domain is STRETCHED-AD and the destination administrative domain is STRETCHED-AD. Similarly, from the perspective of the destination segment (segment 218), the source administrative domain is STRETCHED-AD and the destination administrative domain is STRETCHED-AD. Thus, in case 3 of table 500, the flow record can now be accurately disambiguated regardless of where the observation point is located because the source and destination IP addresses will be uniformly mapped to STRETCHED-AD.

For case 4, from the perspective of the source segment (segment 228), the source administrative domain is S220-R224-AD and the destination administrative domain is STRETCHED-AD. Similarly, from the perspective of the destination segment (segment 226), the source administrative domain is S220-R224-AD and the destination administrative domain is STRETCHED-AD. Thus, flow records corresponding to case 4 can be accurately disambiguated regardless of where the observation point is located because the mappings are consistent and accurate.

For case 8, from the perspective of the source segment (segment 218), the source administrative domain is STRETCHED-AD and the destination administrative domain is GLOBAL-AD. Similarly, from the perspective of the destination segment (the global administrative domain), the source administrative domain is STRETCHED-AD and the destination administrative domain is GLOBAL-AD. Thus, in case 8 of table 500, the flow record can now be accurately disambiguated regardless of where the observation point is located because the source and destination IP addresses will be uniformly mapped to the correct administrative domains.

For case 9, from the perspective of the source segment (segment 226), the source administrative domain is STRETCHED-AD and the destination administrative domain is GLOBAL-AD. Similarly, from the perspective of the destination segment (the global administrative domain), the source administrative domain is STRETCHED-AD and the destination administrative domain is GLOBAL-AD. Thus, in case 9 of table 500, the flow record can now be accurately disambiguated regardless of where the observation point is located because the source and destination IP addresses will be uniformly mapped to the correct administrative domains.

Thus, according to embodiments described herein, source and destination workloads of flow records can be accurately identified using lookup tables and workload identification tables even when the flow records correspond to flows crossing stretched networks.

It is noted that observation point mapping information may be used to determine the lookup table to use for a given observation point. For example, with reference to FIG. 4, observation point mapping information may map EP 219 as an observation point to lookup table 270 and may map EP 229 as an observation point to lookup table 290.

Figure 6:
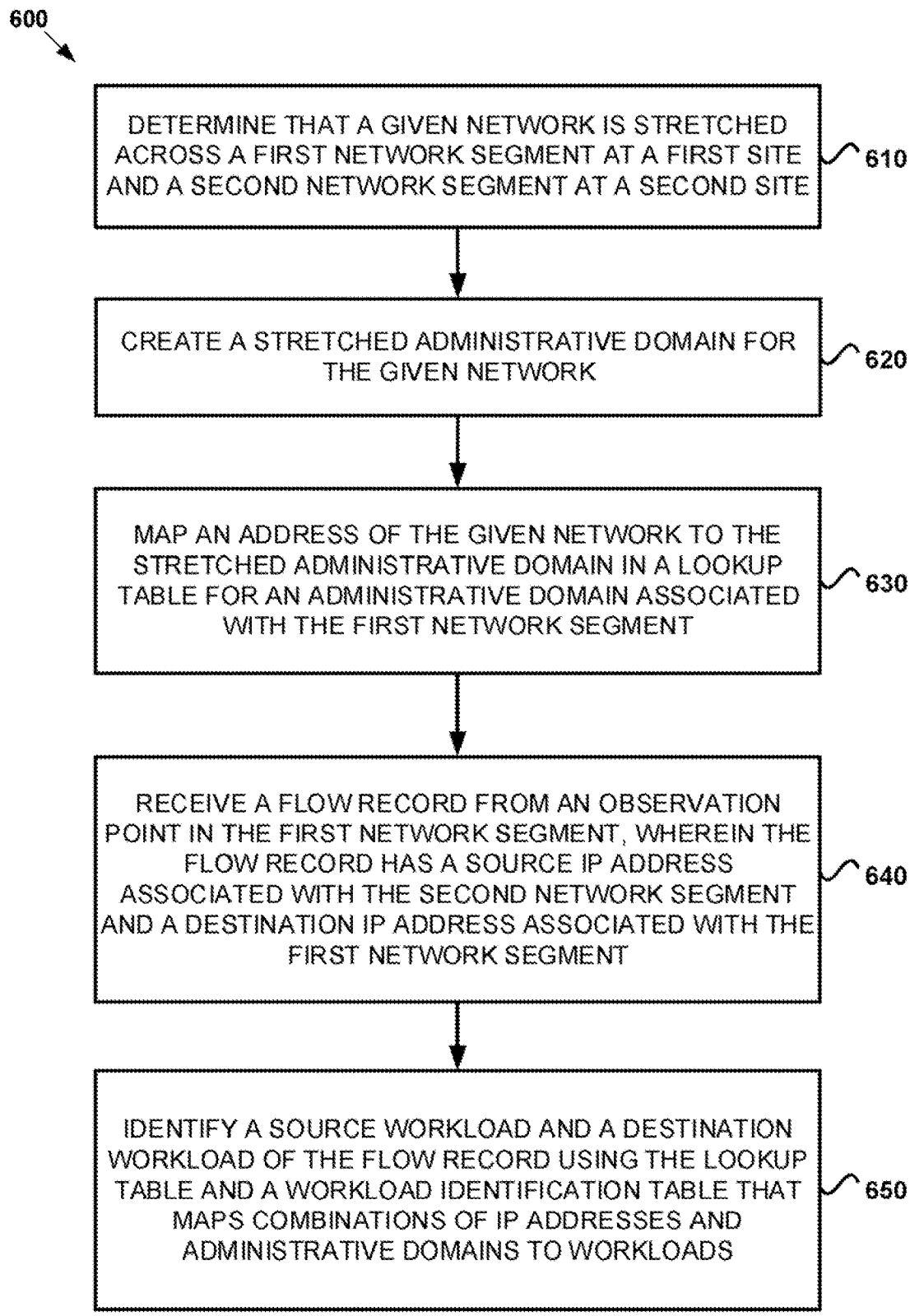
FIG. 6 illustrates example operations related to workload identification in flow records according to embodiments of the present disclosure.

FIG. 6 depicts example operations 600 related to workload identification in flow records according to embodiments of the present disclosure. For example, operations 600 may be performed by management entity 120 of FIG. 1, such as during a process for creating administrative domains and lookup tables for a networking environment based on a network topology of the networking environment.

Operations 600 begin at step 610 with determining that a given network is stretched across a first network segment at a first site and a second network segment at a second site. For example, management entity 120 of FIG. 1 may determine that the given network is stretched based on a network topology generated from aggregated network state and topology information received from throughout the networking environment.

Operations 600 continue with step 620 with creating a stretched administrative domain for the given network.

Operations 600 continue with step 630 with mapping an address of the given network to the stretched administrative domain in a lookup table for an administrative domain associated with the first network segment. The address of the given network may comprise a range of IP addresses.

Operations 600 continue with step 640 with receiving a flow record from an observation point in the first network segment, wherein the flow record has a source IP address associated with the second network segment and a destination IP address associated with the first network segment.

Operations 600 continue with step 650 with identifying a source workload and a destination workload of the flow record using the lookup table and a workload identification table that maps combinations of IP addresses and administrative domains to workloads. Identifying the source workload and the destination workload of the flow record may further be based on observation point mapping information that maps the observation point in the first network segment to the administrative domain associated with the first network segment.

The observation point mapping information may be generated by, for each respective administrative domain of a plurality of administrative domains, and for each respective workload within the respective administrative domain, creating an entry in the observation point mapping information that maps the respective administrative domain to each observation point that captures flow records of the respective workload.

Some embodiments further include mapping the address of the given network to the stretched administrative domain in an additional lookup table for an additional administrative domain associated with the second network segment. Certain embodiments further include receiving an additional flow record from an additional observation point in the second network segment, wherein the additional flow record has a source IP address associated with the first network segment and a destination IP address associated with the second network segment, and identifying a source workload and a destination workload of the additional flow record using the additional lookup table and the workload identification table.

The address of the given network may also be mapped to the stretched administrative domain in a corresponding lookup table for the stretched administrative domain, and identifying the source workload and the destination workload of the flow record may further be based on the corresponding lookup table for the stretched administrative domain.

Certain embodiments further include mapping the address of the given network to the stretched administrative domain in a global lookup table for a global administrative domain. Furthermore, an additional flow record may be received from an additional observation point in the global administrative domain, wherein the additional flow record has a source IP address associated with the first network segment and a destination IP address associated with the global administrative domain, and a source workload and a destination workload of the additional flow record may be identified using the global lookup table and the workload identification table.

In some cases, the source workload and the destination workload of the flow record are used to perform at least one of the following: segregate the flow record with respect to a plurality of flow records; or de-duplicate the flow record with respect to the plurality of flow records.

In a particular example, described with respect to components of FIG. 4, a flow may be transmitted from EP 229 to EP 219. A flow record of the flow has a source IP address of 192.168.2.20 and a destination IP address of 192.168.2.10. If the flow record is observed at EP 219, then the observation point mapping information is used to determine that lookup table 270 is to be used to identify the administrative domains of the source and destination IP addresses. In lookup table 270, the IP address range 192.168.2.0/24 is mapped to STRETCHED-AD, so both the source IP address and destination IP address of the flow record will be mapped to STRETCHED-AD.

Lookup tables may be traversed hierarchically to ensure that each IP address is mapped to the highest hierarchical administrative domain to which it corresponds. For example, after determining that subnet 192.168.2.0/24 is mapped to STRETCHED-AD in lookup table 270, the lookup table 410 for STRETCHED-AD may be accessed. In lookup table 410, subnet 192.168.2.0/20 is mapped again to STRETCHED-AD. Thus, there is no higher hierarchical administrative domain to which this subnet is mapped, and STRETCHED-AD is determined to be the administrative domain of all IP addresses in the subnet 192.168.2.0/20.

In another example of hierarchical traversal of lookup tables, if a flow record having a source IP address of 8.8.8.8 is received from an observation point in segment 218, the observation point mapping information will map the observation point to lookup table 270. Lookup table 270 maps subnet 0.0.0.0/0 to S210-R212-AD. Thus, the lookup table 260 for S210-R212-AD is accessed next. In lookup table 260, subnet 0.0.0.0/0 is mapped to GLOBAL-AD. Thus, the lookup table 295 for GLOBAL-AD is accessed next. In lookup table 295, subnet 0.0.0.0/0 is again mapped to GLOBAL-AD. Thus, GLOBAL-AD is the highest hierarchical administrative domain for all IP addresses in the subnet 0.0.0.0/0, and so the IP address 8.8.8.8 is mapped to GLOBAL-AD.

Figure 7:
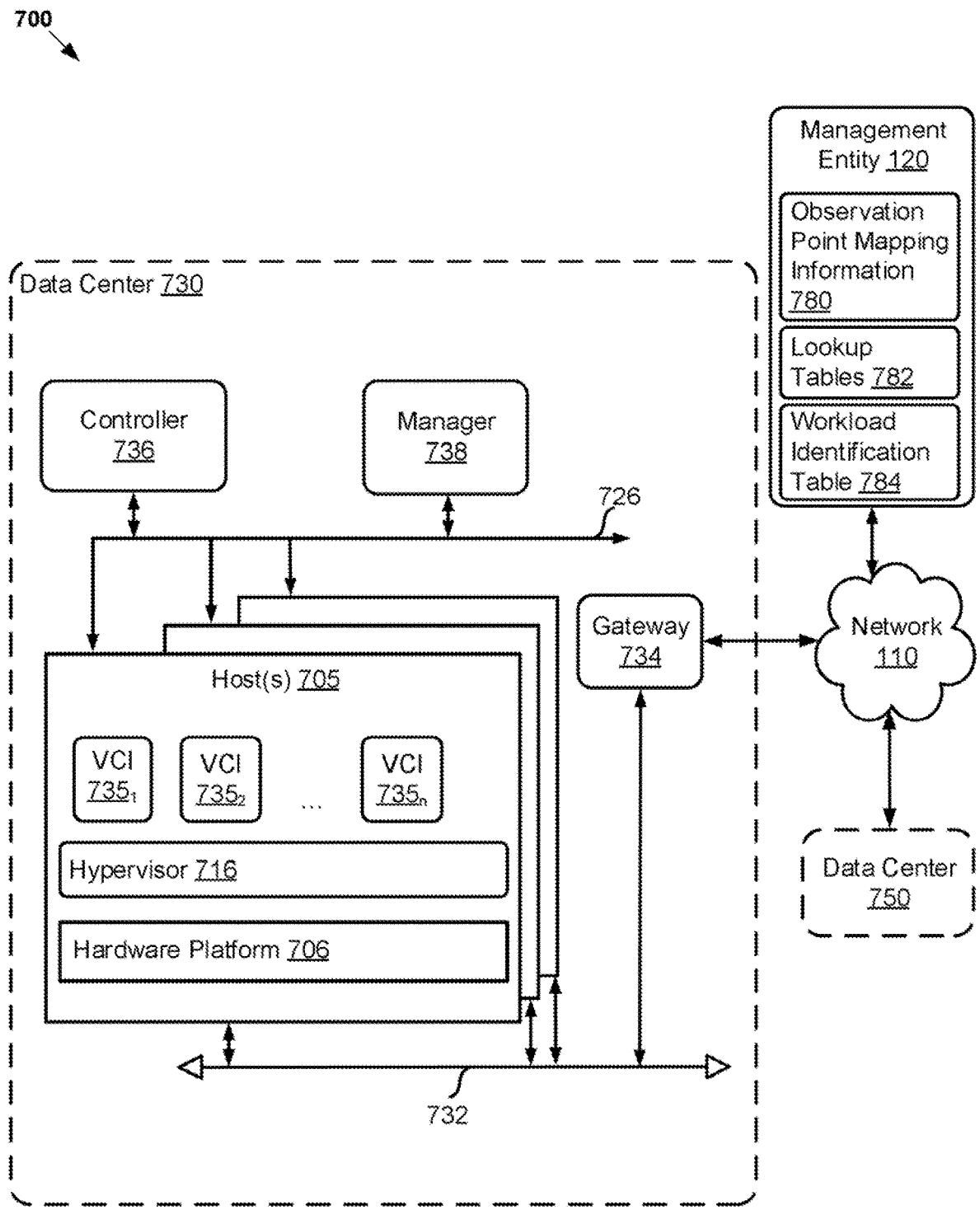
FIG. 7 illustrates a network environment in which embodiments of the present disclosure may be implemented.

FIG. 7 depicts example physical and virtual network components with which embodiments of the present disclosure may be implemented.

Networking environment 700 includes data centers 730 and 750 and management entity of FIG. 1 connected to network 110 of FIG. 1. In some embodiments, data centers 730 and 750 are representative of sites 210 and 220 of FIGS. 2 and 4.

Data centers 730 and 750 each generally represent a set of networked computing entities, and may comprise a logical overlay network. Data center 730 includes host(s) 705, a gateway 734, a data network 732, which may be a Layer 3 network, and a management network 726. Data network 732 and management network 726 may be separate physical networks or different virtual local area networks (VLANs) on the same physical network. Data center 750 may comprise similar elements to those depicted in data center 730.

Each of hosts 705 may be constructed on a server grade hardware platform 706, such as an x86 architecture platform. For example, hosts 705 may be geographically co-located servers on the same rack or on different racks. Host 105 is configured to provide a virtualization layer, also referred to as a hypervisor 716, that abstracts processor, memory, storage, and networking resources of hardware platform 106 into multiple virtual computing instances (VCIs) $735_1$ to $735_n$ (collectively referred to as VCIs 735 and individually referred to as VCI 735) that run concurrently on the same host. VCIs 735 may include, for instance, VMs, containers, virtual appliances, and/or the like. In some embodiments, VCIs 735 include endpoints 130, 132, 134, 136, 140, 142, 144, 146, 150, 152, 154, 156, and/or 158 of FIG. 1 and/or endpoints 219 and/or 229 of FIGS. 2 and 4.

Hypervisor 716 may run in conjunction with an operating system (not shown) in host 705. In some embodiments, hypervisor 716 can be installed as system level software directly on hardware platform 706 of host 705 (often referred to as "bare metal" installation) and be conceptually interposed between the physical hardware and the guest operating systems executing in the virtual machines. In certain aspects, hypervisor 716 implements one or more logical entities, such as logical switches, routers, etc. as one or more virtual entities such as virtual switches, routers, etc. In some implementations, hypervisor 716 may comprise system level software as well as a "Domain 0" or "Root Partition" virtual machine (not shown) which is a privileged machine that has access to the physical hardware resources of the host. In this implementation, one or more of a virtual switch, virtual router, virtual tunnel endpoint (VTEP), etc., along with hardware drivers, may reside in the privileged virtual machine. Although aspects of the disclosure are described with reference to VMs, the teachings herein also apply to other types of virtual computing instances (VCIs) or data compute nodes (DCNs), such as containers, which may be referred to as Docker containers, isolated user space instances, namespace containers, etc. In certain embodiments, VCIs 735 may be replaced with containers that run on host 705 without the use of a hypervisor.

Gateway 734 provides VCIs 735 and other components in data center 730 with connectivity to network 710, and is used to communicate with destinations external to data center 730, such as data center 750 and management entity 120. Gateway 734 may be implemented as one or more VCIs, physical devices, and/or software modules running within one or more hosts 705.

Controller 736 generally represents a control plane that manages configuration of VCIs 735 within data center 730. Controller 736 may be a computer program that resides and executes in a central server in data center 730 or, alternatively, controller 736 may run as a virtual appliance (e.g., a VM) in one of hosts 705. Although shown as a single unit, it should be understood that controller 736 may be implemented as a distributed or clustered system. That is, controller 736 may include multiple servers or virtual computing instances that implement controller functions. Controller 736 is associated with one or more virtual and/or physical CPUs (not shown). Processor(s) resources allotted or assigned to controller 736 may be unique to controller 736, or may be shared with other components of data center 730. Controller 736 communicates with hosts 705 via management network 726, such as through interaction with local controllers on hosts 705 (not shown).

Manager 738 represents a management plane comprising one or more computing devices responsible for receiving logical network configuration inputs, such as from a network administrator, defining one or more endpoints (e.g., VCIs and/or containers) and the connections between the endpoints, as well as rules governing communications between various endpoints. In one embodiment, manager 738 is a computer program that executes in a central server in networking environment 700, or alternatively, manager 738 may run in a VM, e.g. in one of hosts 705. Manager 738 is configured to receive inputs from an administrator or other entity, e.g., via a web interface or API, and carry out administrative tasks for data center 730, including centralized network management and providing an aggregated system view for a user.

Management entity 120 comprises observation point mapping information 780, lookup tables 782, and workload identification table 784. Observation point mapping information 780 generally includes mappings of observation points (e.g., identifiers and/or IP addresses) to administrative domains in order to identify a lookup table 782 to use for a given observation point. Lookup tables 782 may comprise, for instance, lookup tables 260, 270, 280, 290, and 295 of FIGS. 2 and 4. For instance, lookup tables 782 may include mappings of subnets to administrative domains. Workload identification table 784 comprises mappings of combinations of IP addresses and administrative domains to workload identifiers.

For examples, management entity 120 may receive a flow record from a VCI 735, the flow record comprising observation point information (e.g., an identifier and/or IP address of VCI 735), a destination IP address, and a source IP address. Management entity 120 may use observation point mapping information 780 to determine which administrative domain is mapped to the observation point, and may access the lookup table 782 corresponding to the determined administrative domain. Management entity 120 may then use the lookup table 782 to determine administrative domains associated with each of the source IP address and the destination IP address in the flow record. Management entity 120 may then use workload identification table 784 to determine the workload that is mapped to the combination of the source IP address and its corresponding administrative domain and to determine the workload that is mapped to the combination of the destination IP address and its corresponding administrative domain. Thus, management entity 120 is able to disambiguate the source workload and destination workload of the flow record.

It is noted that FIG. 7 depicts one non-limiting example networking environment in which certain embodiments described herein may be implemented. Embodiments may also be implemented in a physical networking environment that does not include logical networking components or a networking environment including both physical and logical networks.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities— usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for identifying workloads in a multi-site networking environment, the method comprising:
   determining that a given network is stretched across a first network segment at a first site and a second network segment at a second site, wherein the first site comprises one or more first routers, wherein the second site comprises one or more second routers, wherein each of the one or more first routers and each of the one or more second routers is associated with a respective lookup table, wherein a first router associated with the first network segment is associated with a first lookup table, and a second router associated with the second network segment is associated with a second lookup table;
   creating a stretched administrative domain for the given network based on the determining that the given network is stretched across the first network segment at the first site and the second network segment at the second site;
   mapping one or more IP addresses associated with the first network segment and one or more addresses associated with the second network segment to the stretched administrative domain in the first and second lookup table for an administrative domain associated with the first network segment and the second network segment;
   receiving a flow record from an observation point in one of the first network segment or second network segment, wherein the flow record has a source IP address corresponding to a source workload, wherein the source IP address is associated with the second network segment, and a destination IP address corresponding to a destination workload, wherein the destination IP address is associated with the first network segment; and
   identifying the administrative domain of the source workload and the destination workload of the flow record using a respective one of the first lookup table or second lookup table, and a workload identification table that maps respective combinations of IP addresses and administrative domains to a respective workload for each of one or more workloads including the source workload and destination workload.

2. The method of claim 1, further comprising mapping the one or more IP addresses of the given network to the stretched administrative domain in a corresponding lookup table for the stretched administrative domain, wherein identifying the source workload and the destination workload of the flow record is further based on the corresponding lookup table for the stretched administrative domain.

3. The method of claim 1, wherein identifying the source workload and the destination workload of the flow record is further based on observation point mapping information that maps the observation point in the first network segment to the administrative domain associated with the first network segment.

4. The method of claim 3, further comprising generating the observation point mapping information by:
   for each respective administrative domain of a plurality of administrative domains:

for each respective workload within the respective administrative domain, creating an entry in the observation point mapping information that maps the respective administrative domain to each observation point that captures flow records of the respective workload.

5. The method of claim 1, further comprising using the source workload and the destination workload of the flow record to perform at least one of the following:
   segregate the flow record with respect to a plurality of flow records; or
   de-duplicate the flow record with respect to the plurality of flow records.

6. The method of claim 1, further comprising:
   mapping the one or more IP addresses of the given network to the stretched administrative domain in a global lookup table for a global administrative domain;
   receiving an additional flow record from an additional observation point in the global administrative domain, wherein the additional flow record has a source IP address associated with the first network segment and a destination IP address associated with the global administrative domain; and
   identifying a source workload and a destination workload of the additional flow record using the global lookup table and the workload identification table.

7. A system for identifying workloads in a multi-site networking environment, comprising:
   at least one memory; and
   at least one processor coupled to the at least one memory, the at least one processor and the at least one memory configured to:
     determine that a given network is stretched across a first network segment at a first site and a second network segment at a second site, wherein the first site comprises one or more first routers, wherein the second site comprises one or more second routers, wherein each of the one or more first routers and each of the one or more second routers is associated with a respective lookup table, wherein a first router associated with the first network segment is associated with a first lookup table, and a second router associated with the second network segment is associated with a second lookup table;
     create a stretched administrative domain for the given network based on the determining that the given network is stretched across the first network segment at the first site and the second network segment at the second site;
     map one or more IP addresses associated with the first network segment and one or more addresses associated with the second network segment to the stretched administrative domain in the first and second lookup table for an administrative domain associated with the first network segment and the second network segment;
     receive a flow record from an observation point in one of the first or second network segment, wherein the flow record has a source IP address corresponding to a source workload, wherein the source IP address is associated with the second network segment, and a destination IP address corresponding to a destination workload, wherein the destination IP address is associated with the first network segment; and
     identify the administrative domain of the source workload and the destination workload of the flow record using a respective one of the first lookup table or second lookup table, and a workload identification table that maps respective combinations of IP addresses and administrative domains to a respective workload for each of one or more workloads including the source workload and destination workload.

8. The system of claim 7, wherein the at least one processor and the at least one memory are further configured to map the one or more IP addresses of the given network to the stretched administrative domain in a corresponding lookup table for the stretched administrative domain, wherein identifying the source workload and the destination workload of the flow record is further based on the corresponding lookup table for the stretched administrative domain.

9. The system of claim 7, wherein identifying the source workload and the destination workload of the flow record is further based on observation point mapping information that maps the observation point in the first network segment to the administrative domain associated with the first network segment.

10. The system of claim 9, wherein the at least one processor and the at least one memory are further configured to generate the observation point mapping information by:
    for each respective administrative domain of a plurality of administrative domains:
      for each respective workload within the respective administrative domain, creating an entry in the observation point mapping information that maps the respective administrative domain to each observation point that captures flow records of the respective workload.

11. The system of claim 7, wherein the at least one processor and the at least one memory are further configured to use the source workload and the destination workload of the flow record to perform at least one of the following:
    segregate the flow record with respect to a plurality of flow records; or
    de-duplicate the flow record with respect to the plurality of flow records.

12. The system of claim 7, wherein the at least one processor and the at least one memory are further configured to:
    map the one or more IP addresses of the given network to the stretched administrative domain in a global lookup table for a global administrative domain;
    receive an additional flow record from an additional observation point in the global administrative domain, wherein the additional flow record has a source IP address associated with the first network segment and a destination IP address associated with the global administrative domain; and
    identify a source workload and a destination workload of the additional flow record using the global lookup table and the workload identification table.

13. A non-transitory computer-readable medium storing instructions that, when executed by one or more processors, cause the one or more processors to:
    determine that a given network is stretched across a first network segment at a first site and a second network segment at a second site, wherein the first site comprises one or more first routers, wherein the second site comprises one or more second routers, wherein each of the one or more first routers and each of the one or more second routers is associated with a respective lookup table, wherein a first router associated with the first network segment is associated with a first lookup table, and a second router associated with the second network segment is associated with a second lookup table;

create a stretched administrative domain for the given network based on the determining that the given network is stretched across the first network segment at the first site and the second network segment at the second site;

map one or more IP addresses associated with the first network segment and one or more addresses associated with the second network segment to the stretched administrative domain in the first and second lookup table for an administrative domain associated with the first network segment and the second network segment;

receive a flow record from an observation point in one of the first or second network segment, wherein the flow record has a source IP address corresponding to a source workload, wherein the source IP address is associated with the second network segment and a destination IP address corresponding to a destination workload, wherein the destination IP address is associated with the first network segment; and identify the administrative domain of the source workload and the destination workload of the flow record using a respective one of the first lookup table or second lookup table, and a workload identification table that maps respective combinations of IP addresses and administrative domains to a respective workload for each of one or more workloads including the source workload and destination workload.

14. The non-transitory computer-readable medium of claim 13, wherein the instructions, when executed by one or more processors, further cause the one or more processors to map the one or more IP addresses of the given network to the stretched administrative domain in a corresponding lookup table for the stretched administrative domain, wherein identifying the source workload and the destination workload of the flow record is further based on the corresponding lookup table for the stretched administrative domain.

15. The non-transitory computer-readable medium of claim 13, wherein identifying the source workload and the destination workload of the flow record is further based on observation point mapping information that maps the observation point in the first network segment to the administrative domain associated with the first network segment.

16. The non-transitory computer-readable medium of claim 15, wherein the instructions, when executed by one or more processors, further cause the one or more processors to generate the observation point mapping information by:

for each respective administrative domain of a plurality of administrative domains:

for each respective workload within the respective administrative domain, creating an entry in the observation point mapping information that maps the respective administrative domain to each observation point that captures flow records of the respective workload.

17. The non-transitory computer-readable medium of claim 13, wherein the instructions, when executed by one or more processors, further cause the one or more processors to use the source workload and the destination workload of the flow record to perform at least one of the following:

segregate the flow record with respect to a plurality of flow records; or de-duplicate the flow record with respect to the plurality of flow records.

* * * * *